(12) United States Patent
Handa

(10) Patent No.: US 7,377,294 B2
(45) Date of Patent: May 27, 2008

(54) GAS COOLING METHODS FOR HIGH PRESSURE FUEL STORAGE TANKS ON VEHICLES POWERED BY COMPRESSED NATURAL GAS OR HYDROGEN

(75) Inventor: Kiyoshi Handa, Rancho Palos Verdes, CA (US)

(73) Assignee: Honda Motor Co., Ltd., Tokyo (JP)

( * ) Notice: Subject to any disclaimer, the term of this patent is extended or adjusted under 35 U.S.C. 154(b) by 30 days.

(21) Appl. No.: 11/279,574

(22) Filed: Apr. 13, 2006

(65) Prior Publication Data

US 2007/0000016 A1  Jan. 4, 2007

Related U.S. Application Data

(60) Provisional application No. 60/673,175, filed on Apr. 20, 2005.

(51) Int. Cl.
*B65B 1/00* (2006.01)

(52) U.S. Cl. ........................................................ 141/82

(58) Field of Classification Search .................. 141/82, 141/2, 18, 98, 286, 67; 62/50.1–50.5; 123/525; 137/255, 263; 272/146.1, 146.6

See application file for complete search history.

(56) References Cited

U.S. PATENT DOCUMENTS

| | | | | |
|---|---|---|---|---|
| 6,182,717 B1* | 2/2001 | Yamashita | ............ | 141/82 |
| 6,899,146 B2* | 5/2005 | Bingham et al. | ............ | 141/11 |
| 7,021,341 B2* | 4/2006 | Viegas et al. | ............ | 141/82 |
| 7,124,790 B2* | 10/2006 | Bushko | ............ | 141/82 |
| 2005/0271916 A1* | 12/2005 | Yang et al. | ............ | 429/20 |

* cited by examiner

*Primary Examiner*—Steven O Douglas
(74) *Attorney, Agent, or Firm*—Mark E. Duell; Porter, Wright, Morris & Arthur LLP

(57) ABSTRACT

At a high pressure refuel depot that dispenses high pressure hydrogen or compressed natural gas to vehicles, the thermal energy (heat) generated by the high flow rate of the high pressure refueling gas is evacuated from the on board fuel tank[s] of vehicles eliminating the need for refueling pre treatments such as a slow fill, secondary precooling, and pressure overfill otherwise used to achieve a full vehicle tank refill. In an example, a high pressure fuel depot refilling line is operatively interconnected to an on board vehicle tank having a gas flow circuit wherein the refuel gas itself is circulated within the on board tank to absorb the compression heat of refueling and then to an external radiator before being released into the tank.

19 Claims, 12 Drawing Sheets

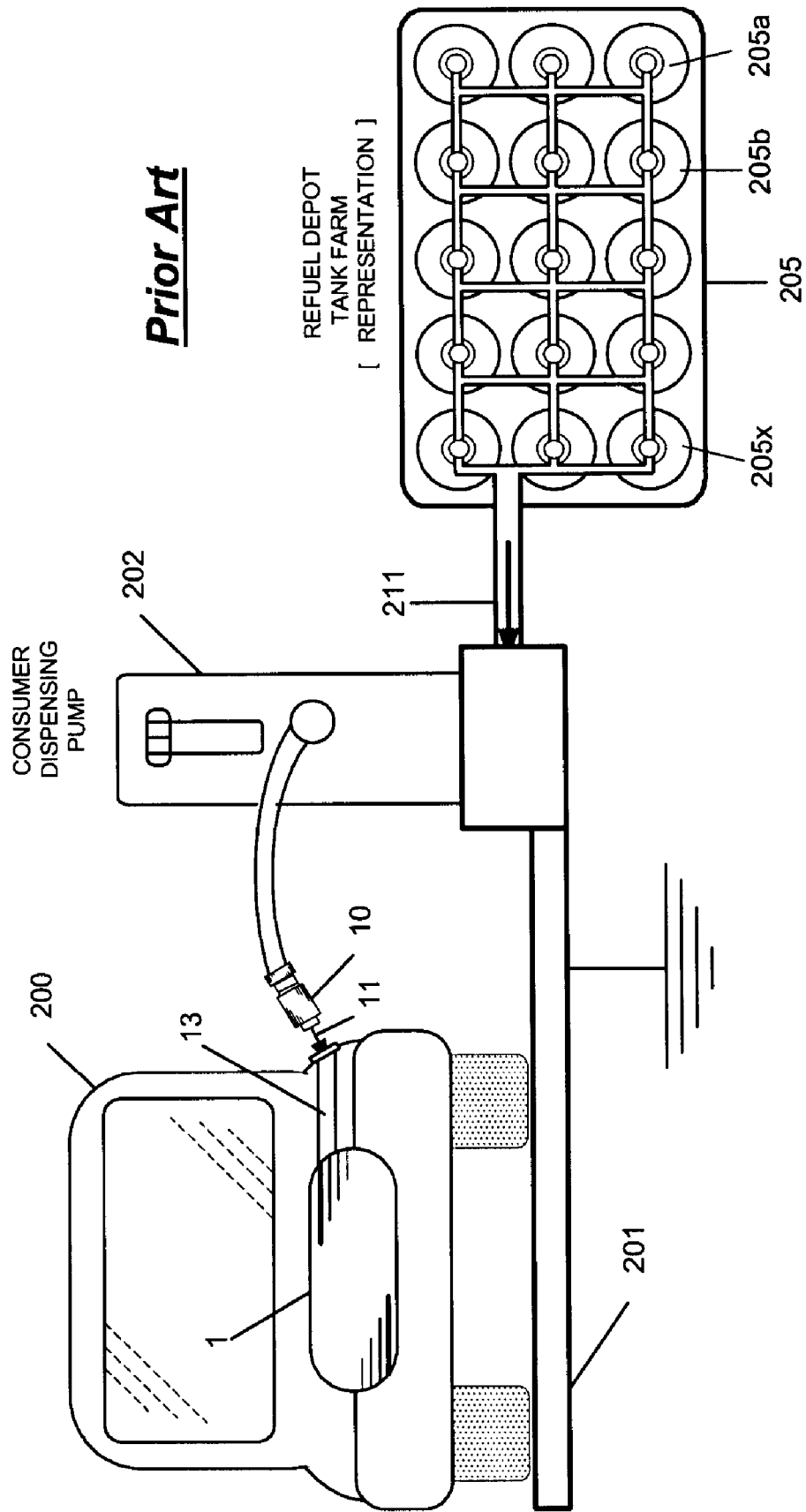

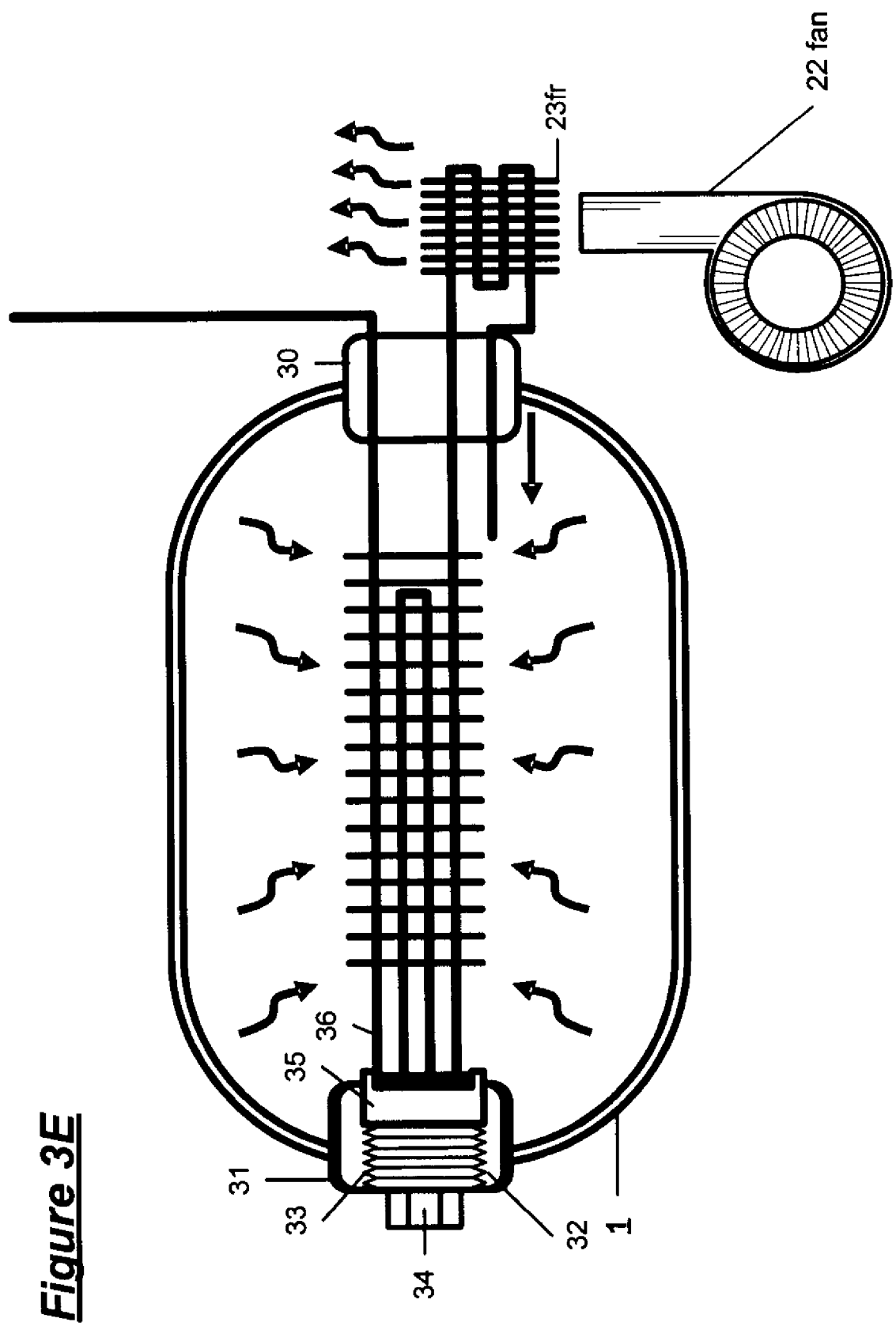

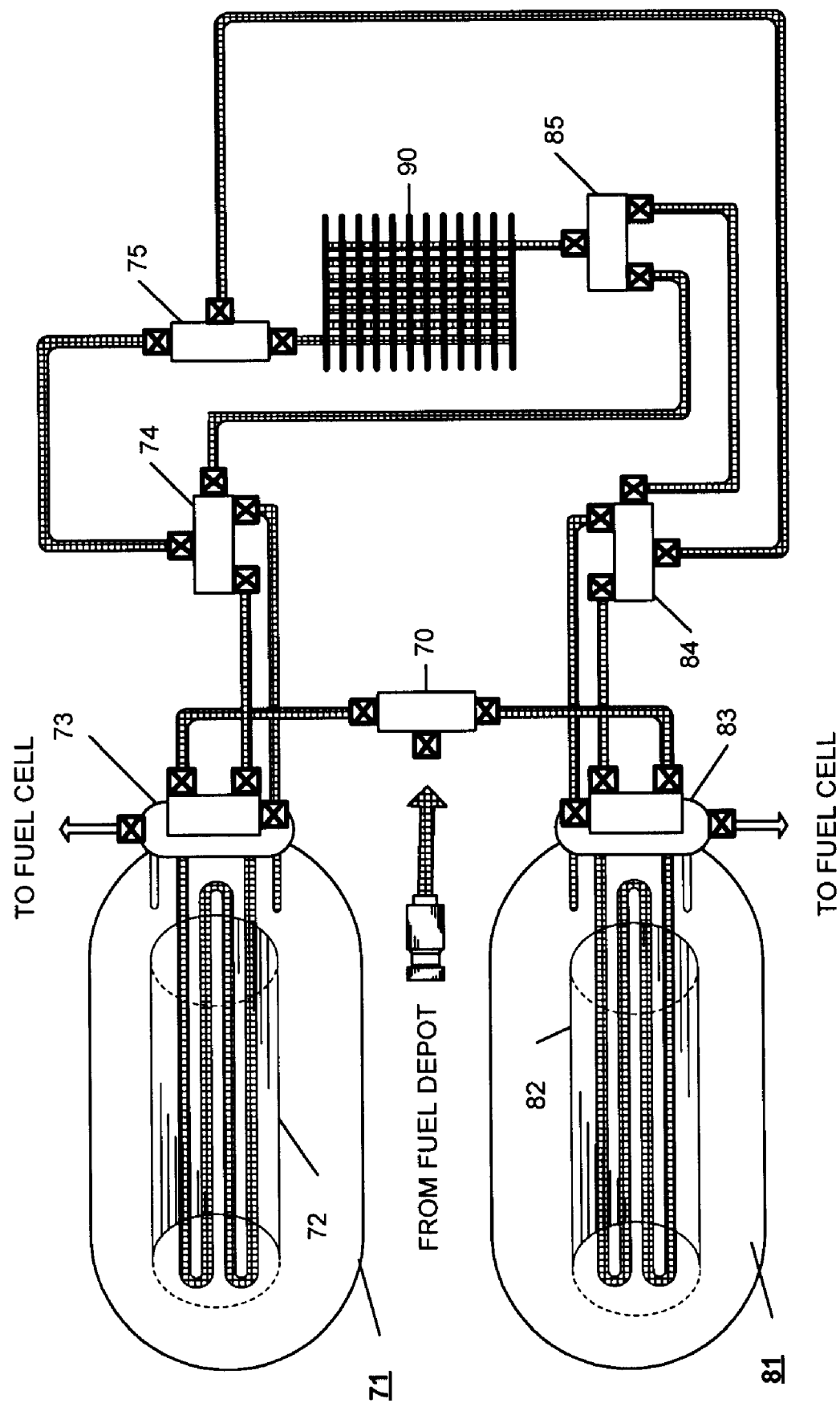

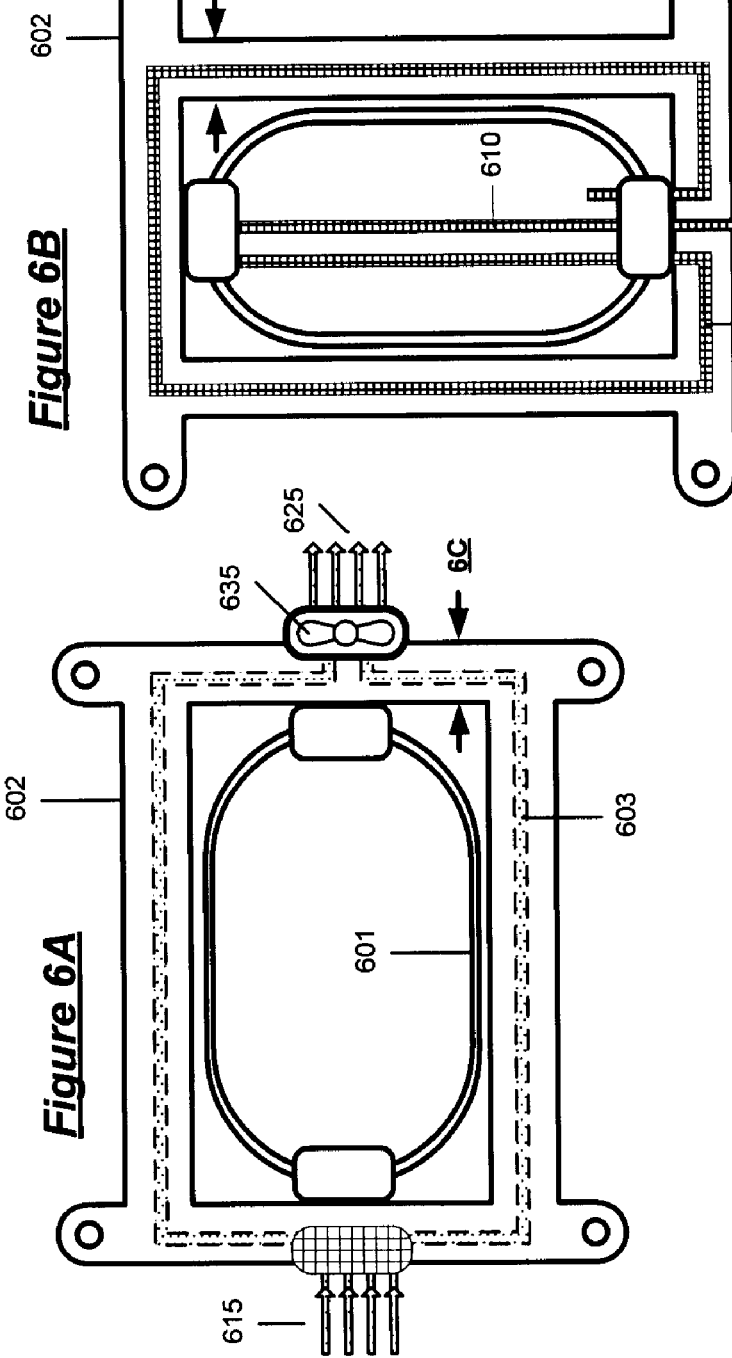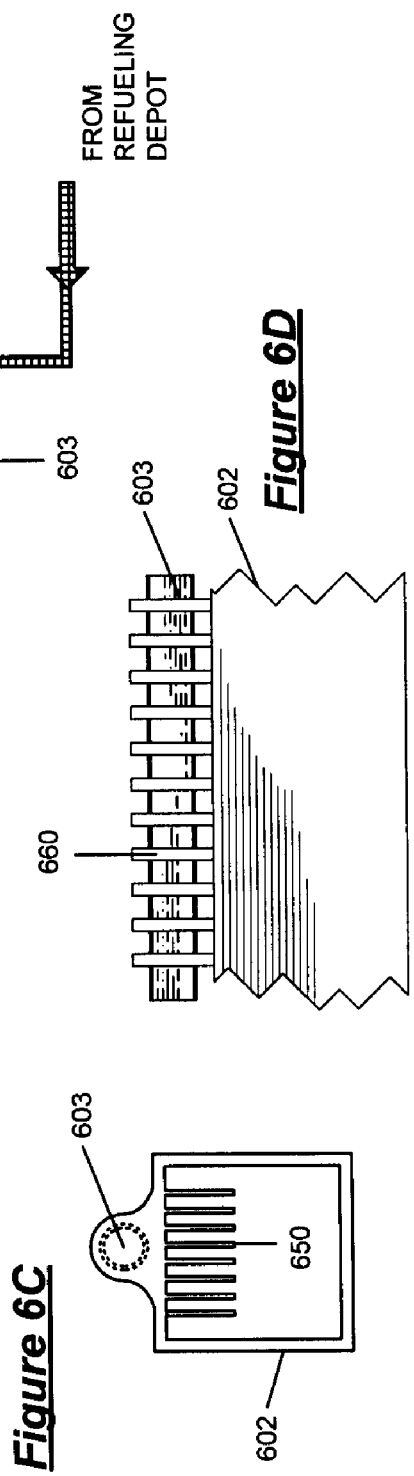

GAS COOLING METHODS FOR HIGH PRESSURE FUEL STORAGE TANKS ON VEHICLES POWERED BY COMPRESSED NATURAL GAS OR HYDROGEN

RELATED APPLICATIONS

This application is related to and claims all benefits under 35 U.S.C. §119(e) of my earlier U.S. Provisional Patent Application Ser. No. 60/673,175 filed on Apr. 20, 2005, entitled "Gas Cooling Methods for High Pressure Storage Cylinder Fuel Tanks on Vehicles Powered by Compressed Natural Gas or Hydrogen."

FIELD OF THE INVENTION

The present invention relates to a system for efficiently refueling high pressure, on board, vehicle gas fuel tanks for hydrogen gas and compressed natural gas at a refueling station where high capacity, high pressure fuel storage tanks provide the fuel to the vehicle through a consumer dispensing means.

BACKGROUND OF THE INVENTION

When high pressure gases, such as hydrogen ("$H_2$") and compressed natural gas (CNG) are used as fuels in motor vehicles, a fuel depot infrastructure for efficient consumer refueling of the vehicles must also be developed. Typically, in the use of hydrogen gas to power fuel cells, or in the use of compressed natural gas, to power internal combustion engines in motor vehicles, present practice is that high pressure fuel is stored is dispensed to and stored in on board fuel tanks maintained at a maximum design pressure in the range of about 5000 psi for hydrogen and about 3600 psi for CNG. Higher pressures in the range of about 10,000 psi are likely to be utilized as a result of consumer preference for longer vehicle range after a refill, and as the art progresses. In the instance of a fuel cell powered vehicle, utilization of the hydrogen input into the fuel cell stack occurs at about 30 psi. An increase in the energy efficiency of the overall system of fuel depots and vehicle tanks and refueling systems and their interrelationships is a desired goal.

Hydrogen powered vehicles may use high pressure hydrogen storage tanks to store hydrogen on board to power vehicle fuel cell stacks. Herein, reference to high pressure hydrogen powered fuel cell vehicles also correlates the use of the invention with high pressure compressed natural gas powered vehicles. [For clarity at times, when hydrogen is referred to in the specification "hydrogen" is a term intended to be interchangeable with compressed natural gas in the high pressure environment discussed herein.] In consumer vehicles, the use of multiple cylindrically shaped small fuel tanks rather than one large tank is preferred for design purposes. Various designs for high pressure hydrogen refueling stations have been proposed to deal with refueling efficiencies. When the on board fuel tanks of a hydrogen powered vehicle are filled with hydrogen, the pressurized on board gas in the tanks may be characterized as having multiple forms of energy: 1) chemical energy associated with the hydrogen fuel itself (consumed in powering the vehicle), and 2) thermodynamic energy, namely, mechanical and thermal energy associated with the physics of high pressure refueling of the on board tank from sources of fuel at the refuel depot.

Hydrogen and CNG fueled vehicles have high pressure on board fuel gas storage tanks. During a high pressure refueling process, the interiors of the on board tanks become heated as a result of fuel gas compression as the tank pressure increases and other refueling parameters affect the refill. After refueling, the interior temperature of the tank and the pressure within the tank both decrease slowly as the fuel gas is consumed during vehicle operation. Conventionally, it is not possible to obtain a full refill tank pressure without pressure compensation during the course of refueling; namely, the charge of fuel pressure input into and stored in the tank must be, at refill, initially in excess of the tank design pressure. Without pressure compensation (an initial overfill), vehicle mileage range is reduced because a full fill is not obtained. When higher optimum tank design pressures are encountered, this condition is exacerbated. In one response to the overfill dilemma, a slower flow rate may be used during refill, which will result in a lower internal tank temperature, and higher pressure, and increased capacity over time. An undesirable consequence of a slower flow rate during refueling to avoid heat build up is self evident—a longer refueling time. Another solution proposes to cool the station fuel gas before refueling; cooling, however, requires substantial energy, thereby reducing the overall efficiency of a hydrogen economy. Pre-cooling the fuel gas is generally unnecessary when fill pressures are at 5000 psi or lower, however, as pressures approach or exceed 10,000 psi, cooling becomes an important factor in the refueling process. A pressure overfill as an option likewise requires additional energy expense where additional gas compression is involved and further increases the heat generated in the tank as a result of high pressure compression during the refill process. In any case, secondary treatment of the refill gas is generally unnecessary when tank fill pressures are at 5000 psi or lower. As tank pressures exceed 3600 psi (for CNG) and 5000 psi (for hydrogen) and approach or exceed 10,000 psi, secondary treatment such as cooling becomes an important factor in the refueling process to achieve a full tank capacity fill. When a full fill is achieved, overall vehicle range per each tank refill thereby increases, energy required for a refill (such as for precooling or a pressure overfill) is reduced, time is saved, and overall customer satisfaction increases.

OBJECTS OF THE INVENTION

It is an object of the present invention to minimize energy loss and increase refueling efficiency in hydrogen refilling systems when factored into the overall energy efficiency of an infrastructure of high pressure gas powered vehicles and fuel depots for the consumer dispensation of high pressure fuel. Typically, each time a vehicle is refueled with hydrogen, mechanical compression transforms into thermal energy and results in the heating of refueled gas in the tank, hence, it is an object of the invention to minimize tank heating and to increase the efficiency and refueling capacity of an on board fuel storage tank in a hydrogen powered motor vehicle. It is an object of the invention to minimize high pressure gas tank heating and to increase the efficiency and refueling capacity of an on board fuel storage tank in high pressure gas powered motor vehicles. It is an object of the invention to provide a system that can remove the compression heat resulting from refueling an on board tank during high pressure refueling. An avoidance of secondary gas cooling pretreatment and/or pressure overfill, a speedier refueling time, increased refueling efficiency, and an extension of overall vehicle range will result. Improved tank capacity per unit volume is achieved during refilling, particularly where nominal refill pressure is in the range of 10,000 psi or greater.

SUMMARY OF THE INVENTION

The invention provides a system that can remove the heat of compression resulting from the high pressure refueling of an on board vehicle tank. Refueling time will decrease and refueling efficiency and overall vehicle range will increase as a result of the improved tank capacity per unit volume achieved by the tank gas cooling system described herein. In accordance with the present invention, effective reduction of fuel tank heating during the refueling process is provided by systems for heat evacuation in which a tank interior heat absorber is interconnected with an external heat radiator, thereby collecting interior tank heat and radiating the absorbed heat into the ambient atmosphere or other system appropriate for the use, radiation, absorption, or disposal of the collected heat of high pressure refueling. At a high pressure hydrogen or compressed natural gas vehicle refuel depot, the thermal energy (heat) generated by from the high flow rate of the high pressure refueling gas is evacuated from the on board fuel tank[s] of consumer vehicles eliminating the need for refueling pre treatments such as a slow fill, secondary precooling, and pressure overfill otherwise used to achieve a full vehicle tank refill. In an example, a high pressure fuel depot refilling line is operatively interconnected to an on board vehicle tank having a gas flow circuit wherein the refuel gas itself is circulated within the on board tank to absorb the compression heat of refueling and then to an external radiator before being released into the tank.

The invention provides a system that can remove the compression heat resulting from refueling an on board tank during high pressure refueling, particularly when nominal refill pressure is in the optimum design range of 10,000 psi or greater. Reduction of fuel tank heating during the refueling process is effected by a heat evacuation system in which an interior tank heat absorber is interconnected with an external heat radiator; the interior absorber collects tank heat resulting from high pressure compression and radiates the absorbed heat into the ambient atmosphere or other vehicle system appropriate for the disposal of collected heat. In a variation utilizing the refuel gas as its own heat sink, a tube circulating the high pressure refueling gas from the consumer pump at the refill depot is circulated in a circuit from within the tank interior to an external radiator where collected heat associated with the refueling process is radiated to or absorbed by the external environment before the refueling gas enters the tank. In this manner; the intrinsic energy from the high flow rate of the high pressure, 10,000 psi or greater, refueling gas is utilized to power the heat evacuation system. Time and energy consuming techniques such as a slow fill, secondary precooling, and pressure overfill are not necessary. In brief, the invention provides a system for reducing the energy and for reducing the time required to refill on board tanks on a vehicle from a high pressure fuel depot refilling line operatively interconnected to the tank wherein the refuel gas itself is circulated within the on board tank to absorb the compression heat of refueling, and the heat thereby absorbed is radiated from the refueling circuit to an external environment before the fuel reaches the tank such that a close to optimum refill of the tank is achieved.

The invention is described more fully in the following description of the preferred embodiment considered in view of the drawings in which:

BRIEF DESCRIPTION OF THE SEVERAL VIEWS OF THE DRAWINGS

FIG. 1A is a representational diagram of a refueling depot or station showing the relationship of the vehicle with a vehicle tank being refilled through a consumer pump or meter interconnected to station fuel storage apparatus.

FIG. 5 shows two tanks connected to a common radiator configured in accordance with the invention herein showing a manifold system with switchable valves allowing tanks to be filled simultaneously in parallel, or individually in series, using a common heat radiator in the refill circuit.

FIG. 6A shows a cooling fluid circulating line circuit disposed within a vehicle frame component for circulating a cooling medium. FIG. 6B shows a cooling fluid circulating line circuit disposed within a vehicle frame tank holding component for circulating the refueling gas, before entry into the tank, in accordance with an embodiment of the invention. FIG. 6C and FIG. 6D show examples of cooling fin configurations disposed on and within a vehicle frame assembly.

DETAILED DESCRIPTION OF THE INVENTION

Figure 1B:
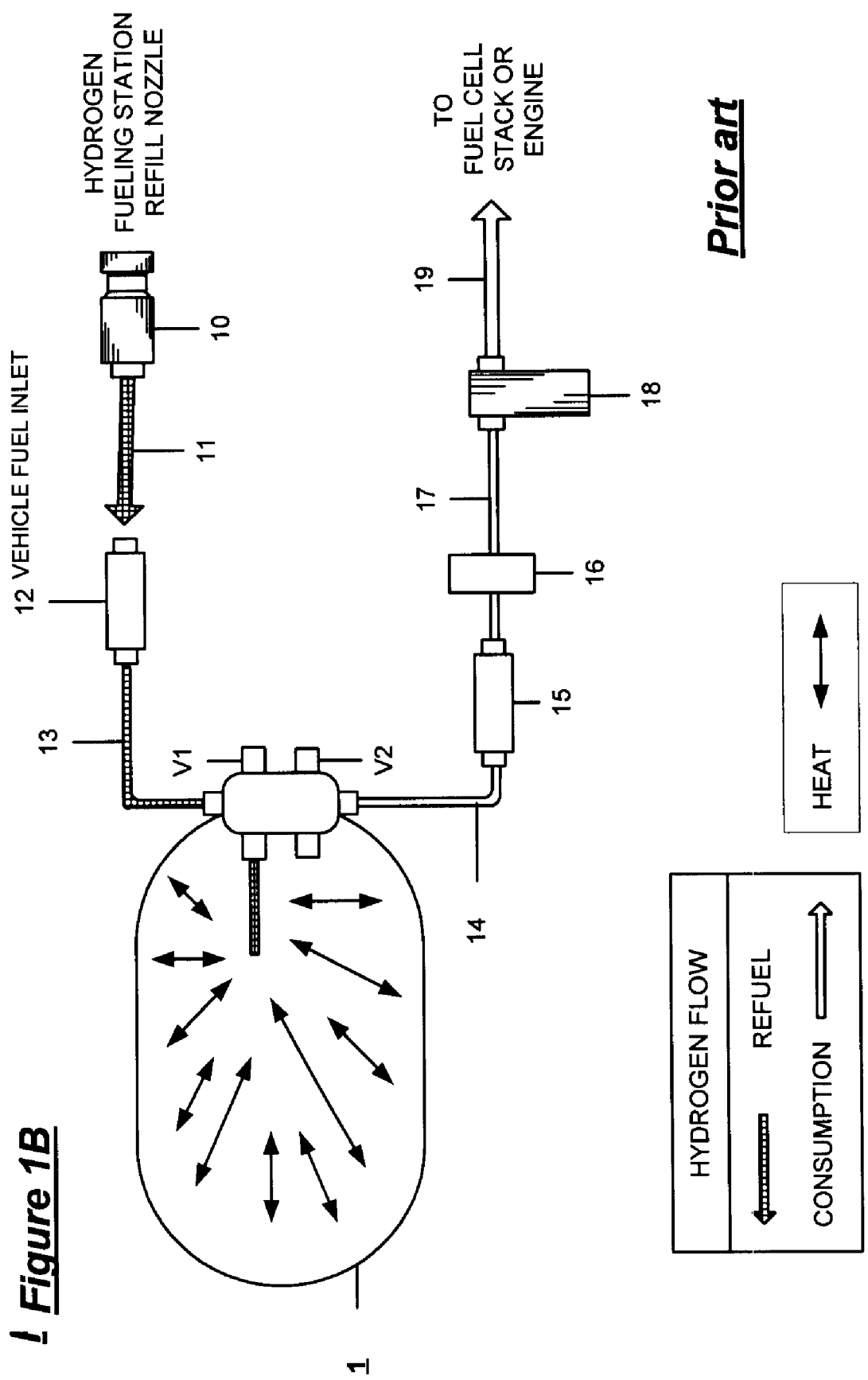
FIG. 1B is a schematic diagram showing heat radiation and build up in a vehicle fuel tank in a prior art pressurized hydrogen or CNG refueling system used in a vehicle.

The system of the invention increases the refueling energy efficiency of hydrogen powered vehicles by withdrawing the heat of refilling compression from the high pressure gas introduced into on board tanks and by eliminating the need for a slow fill, a pressure overfill and/or refueling station precooling of the gas. Less energy is required to completely refill on board vehicle tanks at a refueling depot. The invention reduces the energy required to recharge the on board vehicle tanks with high pressure gas at the station to return the tanks to a full optimal state in the process of refueling. As a result, overall infrastructure energy requirements are reduced, vehicle mileage range is increased, reducing the need for short interval refills, and enhancing consumer satisfaction. The energy and time required to refill on board tanks on a vehicle from a high pressure fuel depot refilling line is reduced by the invention. A cooling circuit coil is disposed within the on board tank and is operatively interconnected with the refuel gas inlet wherein the refuel gas itself is circulated within the cooling circuit in the on board tank to absorb the compression heat of refueling. The compression heat of high pressure refill is thereby absorbed and radiated from the cooling/refueling circuit to an external environment such that a close to optimum refill of the tank is achieved without a slow fill, precooling or pressure overfill.

In general, the invention comprises a vehicle having one or more than one on board tank[s] for the storage of a gas fuel under high pressure wherein the tank[s] include means for operatively interconnecting the one or more tank to a high pressure fuel depot refilling line, an endothermic heat absorbing means within the one or more tank for capturing through means comprising the endothermic expansion of the heat of refueling resulting from gas expansion when the one or more tank is operatively interconnected to a high pressure fuel depot refilling line, and means, interconnected with the endothermic absorbing means, for transferring the heat captured to an exothermic device for radiating the captured heat in the refueling gas to an environment external to the one or more tank.

In an alternative, the invention is a vehicle having one or more than one on board tank for the storage of a gas fuel under high pressure inn which the tank[s] include means for operatively interconnecting the one or more tank to a high pressure fuel depot refilling line, means for circulating the high pressure fuel from the refilling line 1) through an endothermic heat absorbing means within the one or more tank for capturing the heat of refueling resulting from gas compression when the one or more tank is operatively interconnected to the high pressure fuel depot refilling line, 2) to a means for transferring the heat captured to an exothermic device for radiating the captured heat to an environment external to the one or more tank, and 3) to the one or more tank after the circulating the high pressure fuel passes through the exothermic device for radiating the captured heat.

FIG. 1A is a representational diagram of a refueling depot or station showing the relationship of the vehicle with a tank being refilled and other station apparatus. FIG. 1A illustrates an example of a prior art high pressure storage tank system for hydrogen or compressed natural gas motor vehicles. A vehicle 200 is positioned on a pad 201 at the station and includes one or more than one on board tank 1 in series with refuel line 13 connectable to station refill nozzle 10 allowing the flow of hydrogen 11 into the tank. The station refueling nozzle 10 is interconnected to station pump 202 which in turn is interconnected to the refuel depot tank farm 205 (with tanks 205a, 205b . . . 205x) through conduits allowing the flow of gas 211 from the station tanks through the pump or meter 202 to the vehicle tank 1. Refuel depot tank switching systems are not part of the present invention. Typically at the station, the consumer vehicle and the station dispensing pump are grounded to prevent the build up of static electricity. The station refueling system, per se, is not specifically involved in the invention described herein, except as fuel dispensation from the station is affected by the increased efficiencies achieved by vehicles using the systems described herein.

Figure 1C:
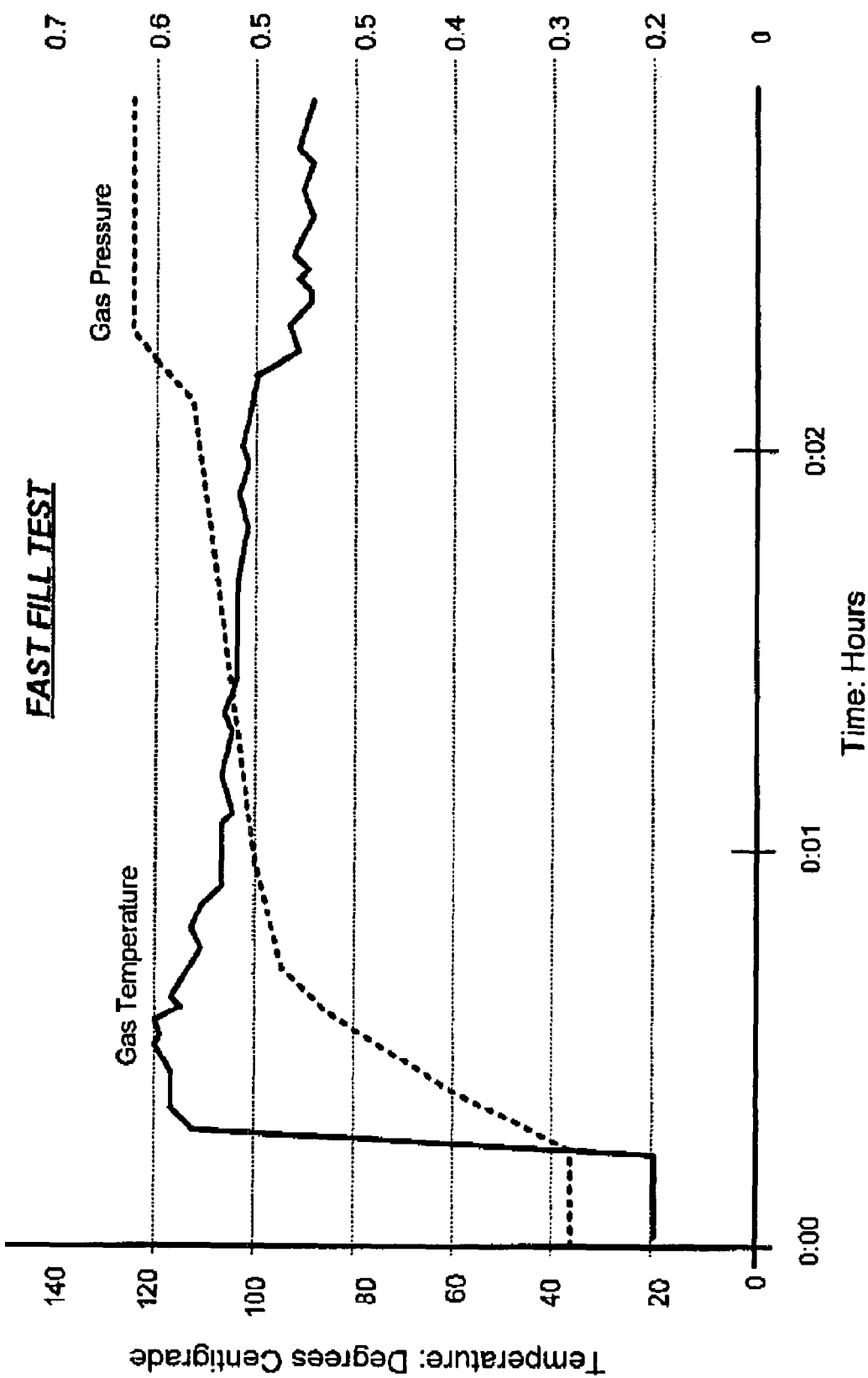
FIG. 1C is a chart of gas temperature T, C.°, and gas pressure, P, derived from a fast fill high pressure.

In FIG. 1B, an on board tank 1 includes an inlet valve V1 with a fuel line check valve 12 in series with refuel line 13 connectable to station refill nozzle 10 allowing the flow of hydrogen 11 into the tank. Fuel consumption line from the tank 14 extends from tank outlet valve V2 through control valve 15 and pressure regulators 16 and 18 to the hydrogen fuel cell stack or CNG powered engine through fuel lines 17 and 19. A chart of gas temperature T [C.°] and gas pressure P derived from a fast fill test of a system of FIG. 1B is shown in FIG. 1C.

Typically the high pressure gas vehicle fuel tanks are cylindrical with hemispherical ends and are formed from reinforced fiber composite material (e.g., a carbon fiber exterior winding and an aluminum alloy/plastic interior liner) and are capable of storing a charge of high pressure gas at an approximately 5000 psi for hydrogen and approximately 3600 psi for CNG, and up to 10,000 psi or more at a maximum rated pressure capacity at a defined temperature. Notwithstanding pressure/temperature capacity, a typical full vehicle tank charge, by an alternative weight fill measurement, of hydrogen for a standard vehicle may be approximately 15 pounds. During refueling, gas in the tank interior is compressed, creating heat figuratively shown by the arrows →, →, etc., in FIG. 1B. Temperature within the vehicle tank increases with higher gas pressure during refill, but as a practical matter, the maximum allowable design temperature in an on board tank may preclude a full refill if temperature constraints are exceeded. In contrast, the system of the invention evacuates the heat of refueling compression by providing the cooling systems described below that utilize the intrinsic refilling energy of the gas to remove the heat build up in the vehicle tank system. As a result, increased fill is achieved and refueling time is reduced. While the terms "endothermic" and "exothermic" generally refer to chemical reactions that respectively absorb heat and release heat, the respective terms may be used herein at times to refer to heat absorbing and heat releasing phenomena, and materials, in general, rather than reactions pre se, as will be evident from the context of use. In addition, the term "tank" is equally applicable to a single storage unit, and as is more likely the case, multiple tanks as they are preferred in vehicle design. The cooling coil circulation system is light in weight (compared to a thermally conductive liner), has a small dead volume in the tank, and is low in cost. The invention utilizes a preexisting energy source intrinsic in the mechanical energy of the high pressure gas being refilled resulting in a considerable cooling heat flow arising from absorption within the vehicle tank to the radiation of the heat in a device external to the tank.

Figure 2A:
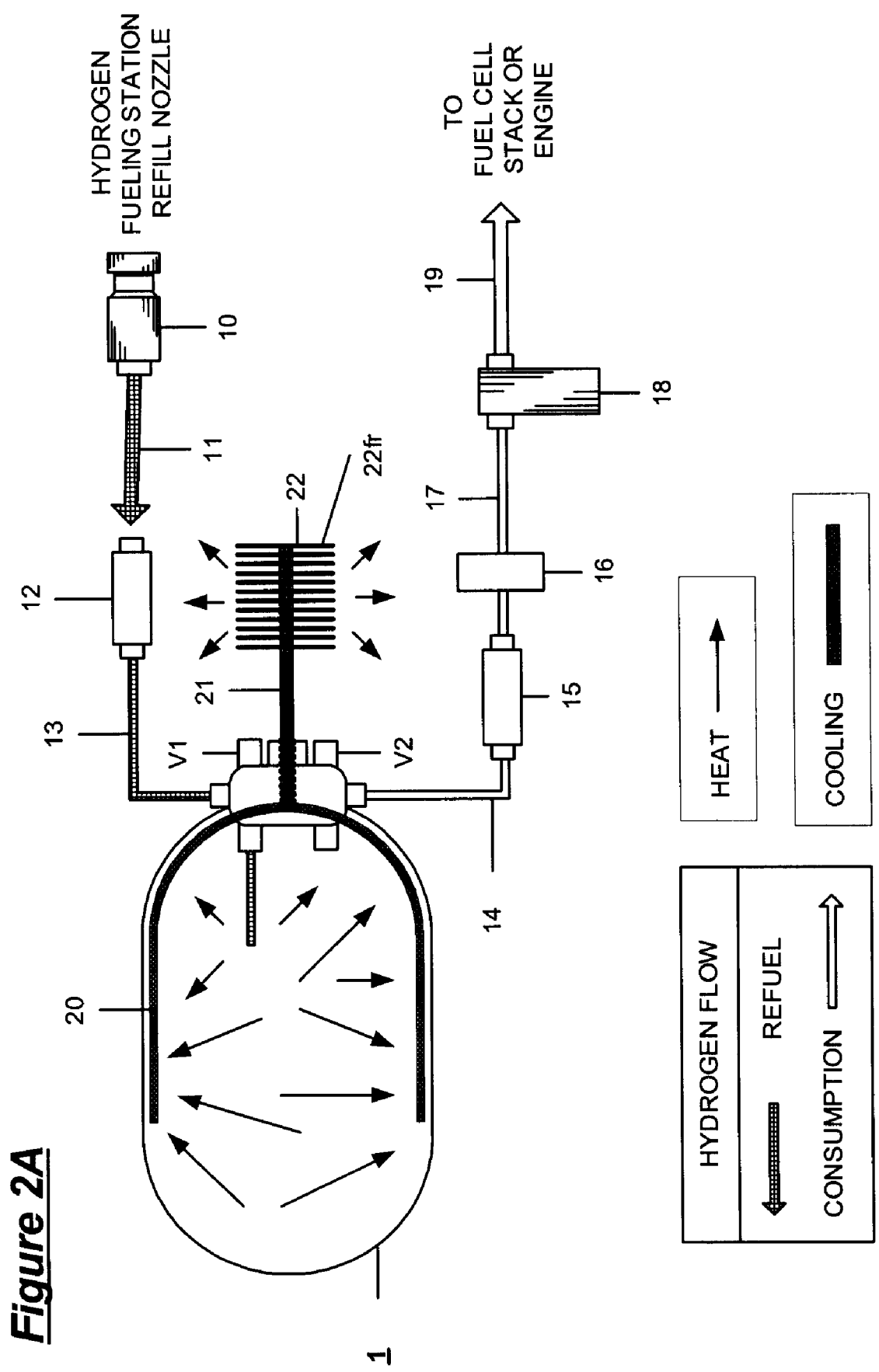
FIG. 2A shows a metal interior liner encompassing at least a portion of the tank interior surface area, utilized, in one example, to absorb the refueling heat of compression by heat mass absorption. The heat absorbed by the liner may be transferred by conduction to the tank exterior where the captured heat is radiated.
Figure 2B:
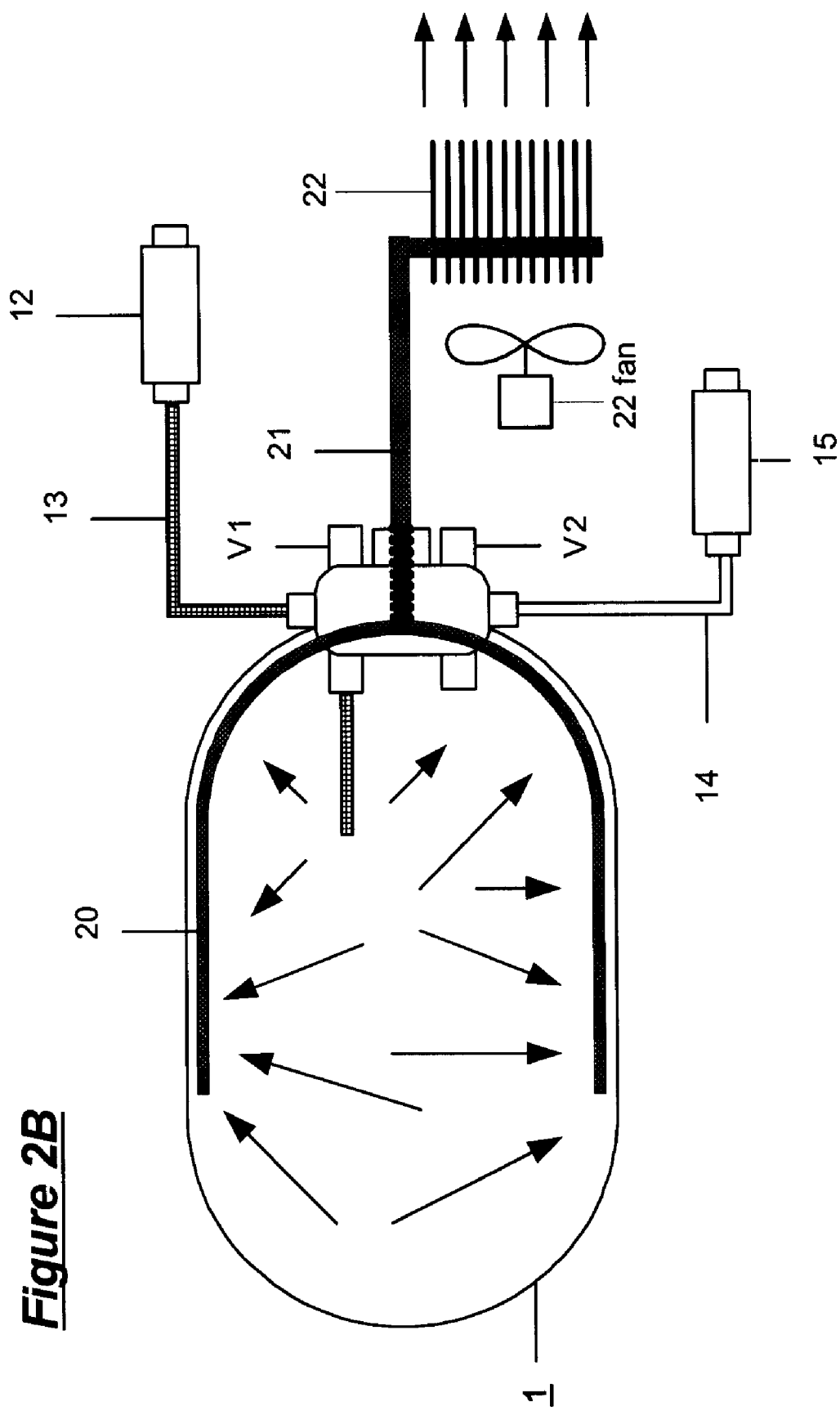
FIG. 2B shows such a system with an auxiliary blower or fan adjacent the radiator to assist in heat removal.

FIG. 2A illustrates an example of a motor vehicle high pressure fuel storage tank system of the type typically employed with CNG or hydrogen gas powered vehicles. A representative fuel tank is formed of a carbon fiber or a plastic composite thereof and, for heat removal, may include an interior liner formed of highly conductive aluminum or copper, or alloy of either, or other endothermic material or heat sink 20, that captures the compression heat of refueling indicated by the arrows →, →. The endothermic material or heat sink in the tank interior may be configured similarly to the exothermic device exterior to the tank; in the former instance the device absorbs heat, in the latter instance, the device radiates heat. The captured heat is in turn transmitted through a highly conductive heat transfer pipe or conduit 21 to an external radiator 22 having a plurality of radiating fins 22*fr*, or other heat radiator mechanism. The exothermic radiator (as well as the endothermic absorber) may include fins, pins, plates, wave shaped radiators, mesh, corrugation like elements, or other like devices having high thermal conductivity and high surface area per unit volume or weight, allowing for the maximum thermal efficiency with regard to heat absorbed and heat radiated. Heat conduit 21 may be formed of highly conductive aluminum or copper, or alloy of either, or other thermal conductor, in which instance, entropic flow of energy is from hot (the liner within the tank) to cool (the radiator outside). Alternatively, conduit 21 may comprise a heat pipe, conventionally defined as including a condensing material within a capillary structure in a sealed hollow tube, optionally under pressure. In a heat pipe; the condensing material passes to a vapor phase upon the endothermic absorption of heat, and thereafter condenses to a solid or liquid phase in an exothermic phase change, when heat is radiated there from in a "heat flow cycle" from the tank to the radiator to the tank, etc. Capillary action in the wick of the heat pipe returns cooled condensate to the interior of the fuel tank containing the heated gas whereupon the heat pipe cycle is repeated. In a typical environment for the operation of a motor vehicle, the condensing material used in a heat pipe may typically comprise Freon®, water, a mixture of distilled water and organic fluids such as acetone, methanol, ethanol, toluene, and the like or their equivalents. Typically, the hollow tube of a heat pipe is formed from thermally conductive materials such as Al, Cu, SUS, etc., When the refill pressure is 5000 psi, precooling the fuel dispensed to a vehicle at the fuel depot is unnecessary because the tank liner in this example will absorb excessive heat. Metal liner tanks are, however, expensive and heavy and are inadequate to handle the heat load associated with a 10,000 psi fuel refill. An auxiliary cooling system adapted to the liner/radiator embodiment depicted in FIG. 2A, using a fan or blower, 22 fan, operatively disposed to circulate ambient air through radiator 22 and remove heat there from is schematically depicted in FIG. 2B. The same numbering and drawing conventions as are used in FIG. 2A are used in FIG. 2B, except for the addition of blower or fan indicated by the notation 22 fan. In the examples herein, operation of the fan or the blower is evidently dependent on factors such as radiator capacity, rate of heat transfer to the radiator, temperature of heat transferred, fan or blower (cubic feet per minute (cfm)) capacity effective at the radiator, temperature of the ambient external environment, and the like. A control system for the fan may be configured to interrelate the foregoing factors and determine appropriate fan speed, on and off timing, and the like.

Figure 3A:
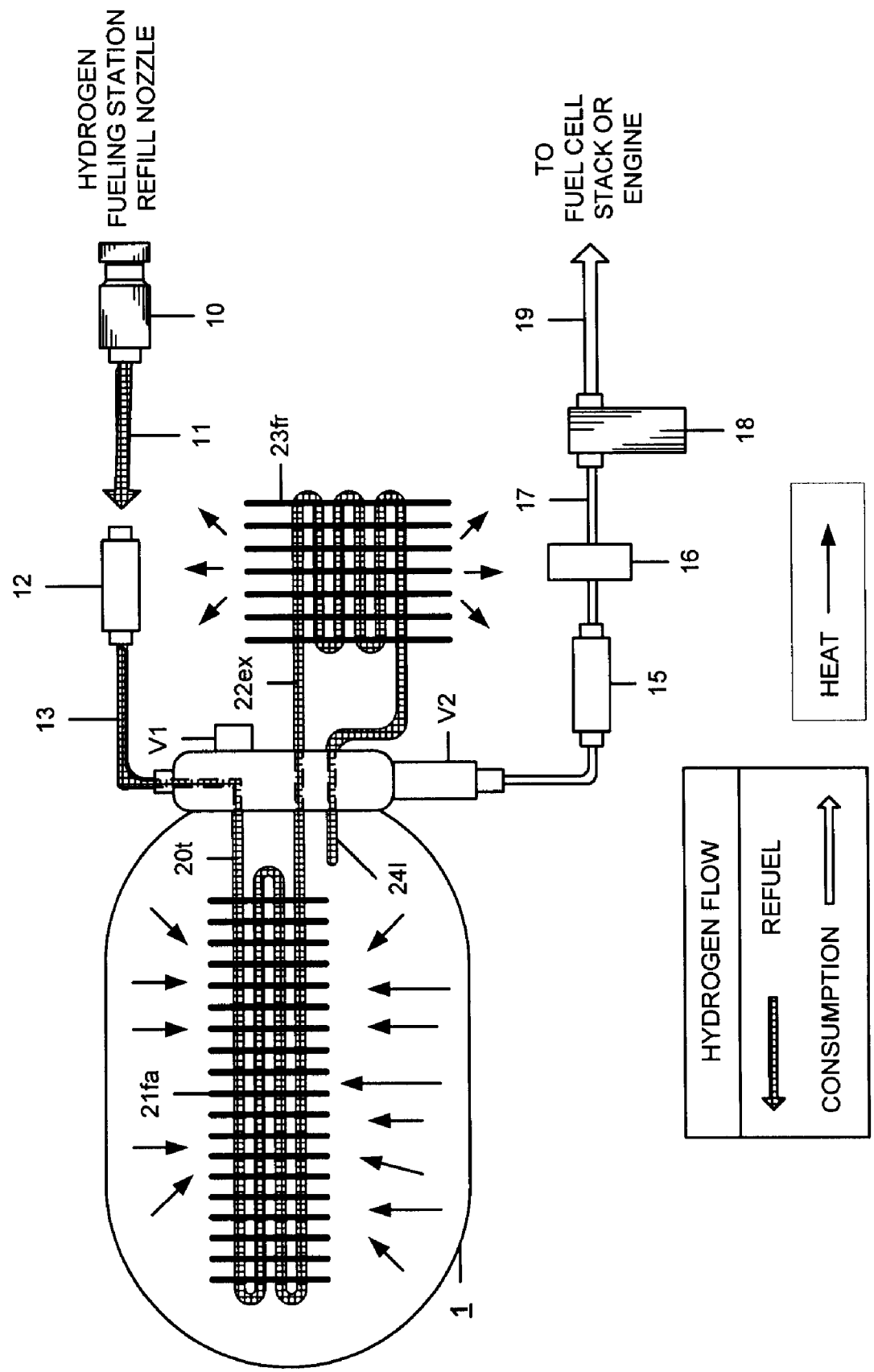
FIG. 3A shows a one tank example of a heat absorbing coiled circuit disposed within the interior of an on board tank where refill gas circulates through an endothermic circuit, first, in a coil through the tank, and then to an external radiator exothermic circuit before the refill gas, now cooled, is reintroduced into the tank in a separate nozzle after the absorbed heat is eliminated.

FIG. 3A illustrates a vehicle high pressure storage tank system of the invention including a heat absorbent tube in the tank interior formed as a refueling coil circuit to utilize the mechanical, thermal energy of high pressure refill gas within the refueling line through circuit lines 13 and 20*t* to absorb the refueling heat of compression 21*fa* by the high pressure gas of refueling as the gas expands within the tank and to transfer the so absorbed heat to an external radiator through circuit lines 22*ex* and 23*fr* to radiate the heat absorbed to the external environment, through the circuit. The high pressure gas from the refuel depot, after having circulated within a closed endothermic heat capture system within the tank, to the exothermic principally heat releasing conduit in a heat radiator circuit, is cooled.

Ultimately the circulated cooled gas is introduced into the tank through a separate orifice or valve such as 24*I*. In FIG. 3A, after the refill gas passes through inlet valve V1, the heat absorption refueling pipe interior coil 20*t* circulates the refueling gas within the tank interior in one or more circuits. The coil includes a plurality of thermally conductive heat absorbent fins 21*fa*, pins, mesh, corrugations and like structures preferably formed from copper or aluminum or alloys thereof (as noted in above examples). The circulating refill gas (with heat absorbed) exits the tank through exterior cooling conduit or pipe 22*ex* wherein the circulating gas is directed to an external heat sink or radiator such as the finned device shown as 23*fr*, a mesh radiator, a water chamber, corrugations, wave plates, an auxiliary air cooling fan cooperatively disposed with the same, the vehicle frame or body, or any other like mechanism capable of releasing the absorbed heat. In general, the cooling system elements such as the internal tank heat absorbers, the heat conduit tube to the radiators, the radiator configurations, and fan and blower systems described in any one particular embodiment herein are units or devices interchangeable for comparable use with any other embodiment dependent on design factors and other manufacturing criteria. Thus, high pressure refill gas is introduced into the interior tank coil and while passing through the internal cooling circuit coil absorbs the refueling heat of compression; the heated gas is directed to the external radiator, and having so circulated within the circuit, is ultimately introduced at a cooled temperature into the on board tank. With a cooler temperature, more gas per unit pressure can be input into the tank.

Figure 3B:
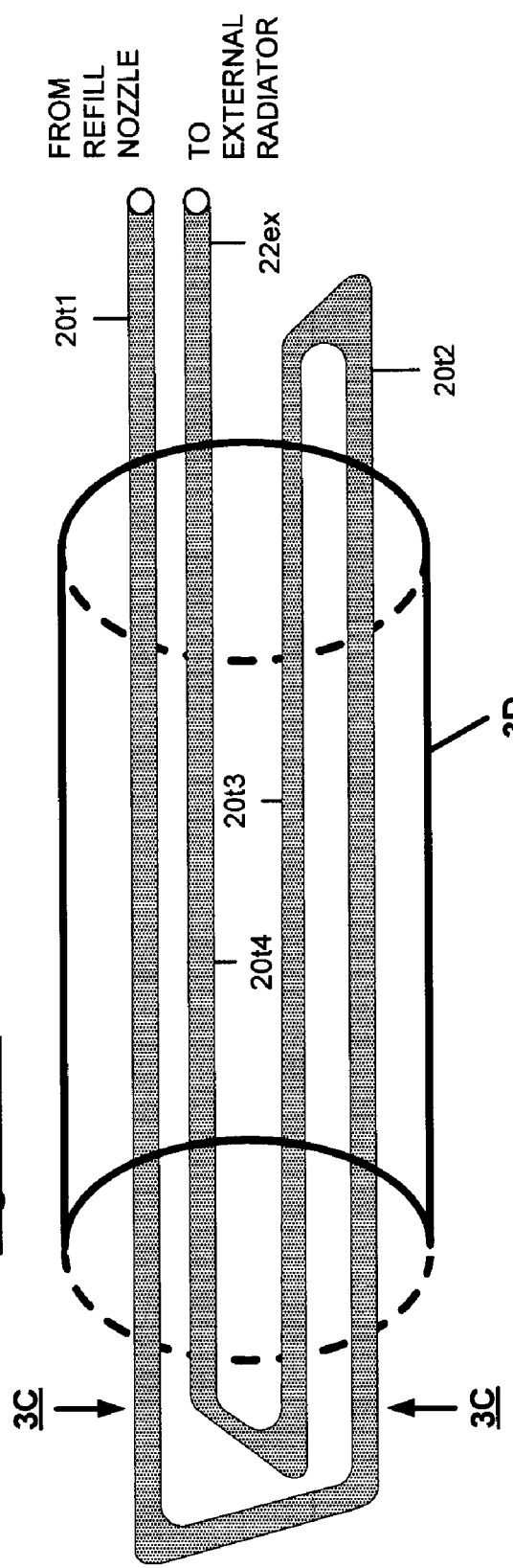
FIG. 3B is a schematic drawing of the refill tubing circuit, within which the refueling gas circulates, disposed within the tank, in which 3C→←3C demarks the end configuration of the tubing as shown in detail in FIG. 3C.
Figure 3D:
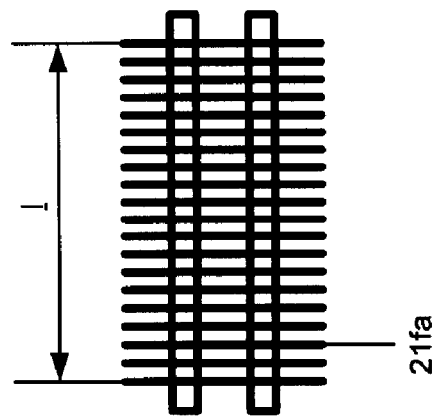
FIG. 3D defines a volume (d=diameter; l=length) for calculating internal heat capacity for a series of fins shown in FIG. 3D utilized for heat absorption.
Figure 3C:
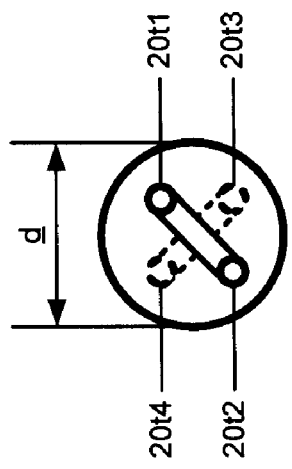
FIG. 3E shows, inter alia, an example of an end cap configuration for the tank used to secure the tube circuit circulating system within the tank, and a blower assisted radiator.

FIGS. 3B, 3C and 3D illustrate the internal tank cooling system having a circulating refuel coil shown in FIG. 3A and a surrounding plurality of heat absorbent fins (not shown in FIG. 3B) within the interior volume of the tank defined by the cylinder shown as 3D. From the refill inlet, the refuel gas tube circuit follows 20*t*1, 20*t*2, 20*t*3, and 20*t*4, exiting the tank interior to external outlet 22*ex* through a conduit to a radiator as described. Physically, as the high pressure gas from the dispensing pump is released, the gas cools; however, as the gas pressure in the tank increases the gas heats. Thus, the circulating (expanding) gas (passing through the radiator) either radiates coolness as heat travels from cold to warm, and/or absorbs the heat of compression as gas pressure in the tank increases to approach the tank capacity optimum. The internal fin assembly 3D has the diameter d shown in FIG. 3C and the length l shown in FIG. 3D. With a given number of fins, e.g., such as 21*fa*, 21*fb*, 21*f* . . . , having 1) a known diameter, 2) a known coefficient of heat absorption and/or heat radiation, and 3) other thermal factors, cooling capacity or heat absorption of the fin assembly within a high pressure tank having a predetermined internal volume defined by the mass and/or surface area of the fins can be calculated. As noted herein, fins are referred to generically as a heat absorber or radiator as described herein (dependent on function) and may include pins, corrugations and the like.

FIG. 3E shows a configuration for a tank 1 of the invention wherein either side of the tank end includes a threaded cap such as 30 and 31; cap 31 at the end of the tank opposite the inlet valve side end includes inside threads 32 in the cap cooperative with exterior threads 33 on a cooling element assembly and locking nut 34 on the end cap side of the tank to maintain the circulation pipe 36 in a fixed position within the tank, as the coil extends from cap 30 into receiver 35. Heat captured from the tank interior is radiated by means 23*fr* or other radiator system and may be assisted by a fan or blower 22 fan or other like means.

Figure 4:
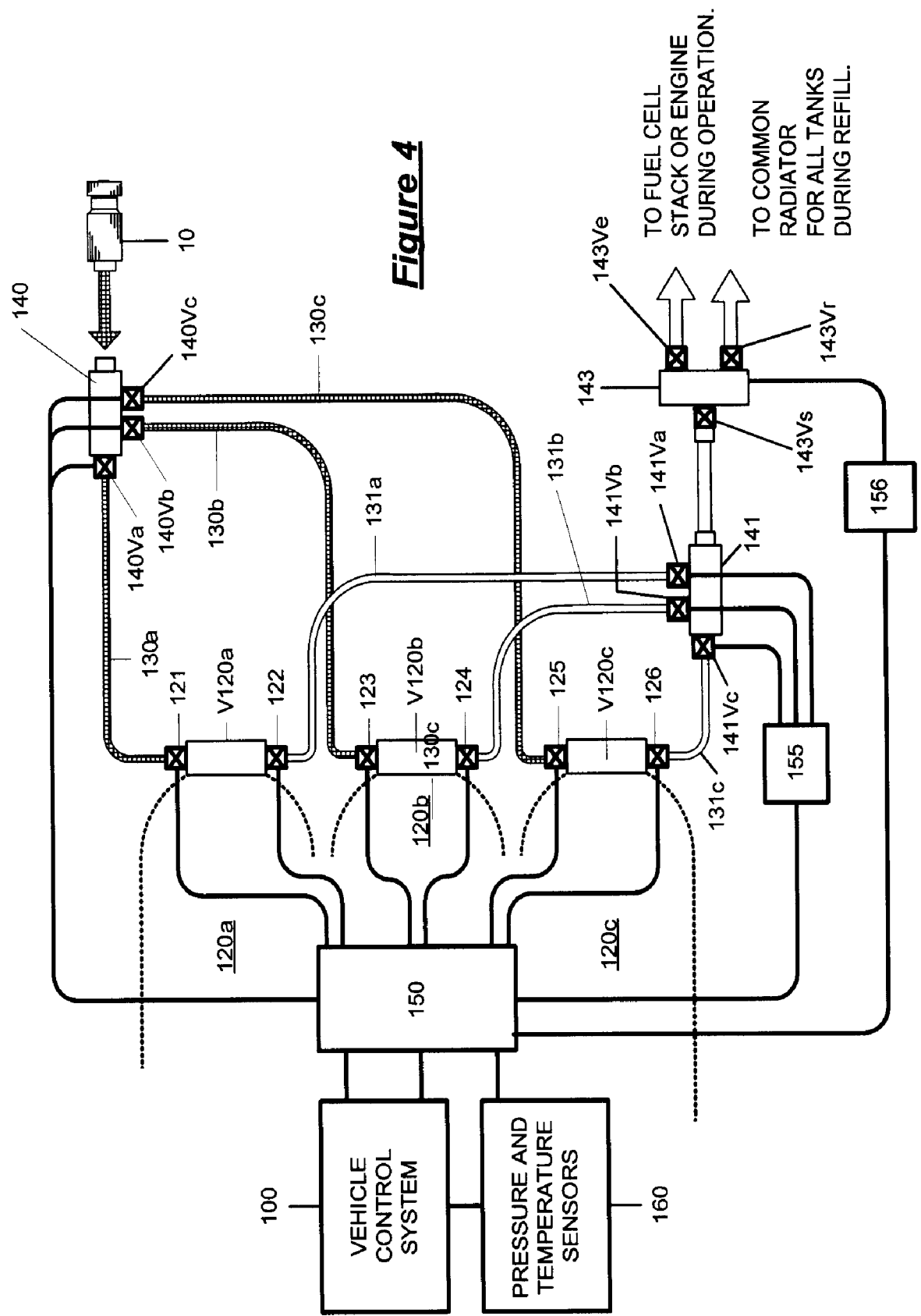
FIG. 4 shows an example of a vehicle control system for multiple tanks, not part of the invention per se, utilized in a vehicle refilling and fuel utilization system adaptable for use with the cooling system herein.

The system is adaptable to multiple tanks and a vehicle control system, for example, as shown in FIG. 4 wherein selectable or controllable inlet valves 121, 123 and 125 and selectable or controllable outlet valves 122, 124 and 126 on each tank 120a, 120b and 120c may be operatively interconnected with a control means, logic circuit, or CPU 150 and the vehicle control system 100 and a pressure and/or temperature or other sensing means associated with the tanks or their inlet and outlet lines. As an alternative or supplemental control system, manifolds 140 and 141, respectively located between the tanks and the refill line and the hydrogen fuel cell stack or engine may have a plurality of controllable valves. In the inlet manifold 140 leading from the refill line, the controllable valves include valves 140Va, 140Vb and 140Vc associated with each tank inlet. The vehicle tank outlet manifold 141 includes controllable valves 141Va, 141Vb and 141VC, each connected to the outlet of an associated tank. The manifold valves may be controlled by means 150 to allow hydrogen flow to or from a selected tank from the refill line or to the fuel cell or engine until a cut off or threshold pressure or temperature or other parameter, as appropriate in a particular instance, in the selected tank or line is reached. As shown, outlet manifold 141 may include a plurality of selectable or controllable valves 141Va, 141Vb and 141Vc interconnected with the outlets 122, 124 and 126 of the vehicle tanks 120a, 120b and 120c, controlled by a separate manifold valve switching means 155, interconnected with means 150. Specific control configurations and parameters, and valve locations and systems in accordance with the principles of the invention are preferably based on overall vehicle design considerations. Valves on manifold 143 may be controlled, as shown, using shutoff valve 143s, valve to the radiator 143r and valve 143e dependent on functionality desired in the system, with operation 1) in one mode with the engine valve off, and the radiator valve on to direct gas to a common radiator for all tanks to allow circulation of the refueling gas during refill, and 2) in another mode, with the engine valve on, and the radiator valve off, to the fuel cell stack or engine during operation. A separate valve switching means 156 is shown interconnected with vehicle control means 150. The switching means 155 and 156 may be integrated with the master vehicle control system 150. When neither mode is desired, closing the shutoff valve will seal the fuel system.

Thus, in one example of FIG. 4, a circuit switching system may provide that heat of refueling carried in the gas conduit is directed to a common radiator for all tanks during refill, and the gas stored in the tank is directed to the fuel cell stack or engine during operation through a same of different outlet valve in the vehicle tank[s]. For example, tank valves may not be required to the extent that a manifold valve system is sufficient, or both tank and manifold valves may be included if desired by design considerations. In another example, pressure, temperature and other sensors 160 may be provided to monitor tank and/or line pressures and temperatures or other parameters, and the measure of the pressure and temperature or other parameter sensed may be input into an appropriate control means as a determinant associated with the operating protocol of the tank or manifold valve system for refilling and consumption of pressurized hydrogen fuel in the course of vehicle operation. [Reference: Co-pending application number 11/001,881, "Hydrogen Vehicle Gas Utilization and Refueling System" filed on Dec. 2, 2004 assigned to the same assignee as is the present application hereof.]

FIG. 5 shows two vehicle tanks connected to a common configured in accordance with the invention herein showing a manifold system with switchable valves allowing tanks to be filled simultaneously in parallel or individually in series, using a common heat radiator. In FIG. 5, tanks 71 and 81 are disposed on the same vehicle; the tanks respectively include heat absorbing fin assembly and gas circulating tube circuits as discussed in the above examples. A series of manifolds having switchable or programmable valves is associated with each tank:—73, 74 and 75 associated with tank 71; and 83, 84 and 85 associated with tank 81. The valves can be switched to allow simultaneous parallel filling of the tanks using the same radiator 90 for both tanks, or may be alternatively programmed to allow tanks 71 and 81 to be filled individually in series. The programming of the valves and the number of tanks is a matter of design choice given the teachings herein and other desired vehicle operating parameters. Manifold 70 receives high pressure gas from the fuel depot and includes switchable valves consistent with the operating protocols stated above. Multiple vehicle tank configurations may be configured with selectable inlet valves and selectable outlet valves wherein a common coolant circulating pipe leads from each tank to a common radiator and/or circulating pump. The coolant system inlet valves and outlet valves may be operatively switched by a control means such that when the tanks are filled at the same time in parallel, both tanks are cooled simultaneously, or when each tank is separately filled singly in a series, only a single tank being filled is cooled. In multiple tank embodiments, duplication of material and systems is avoided, achieving savings in weight and cost. In all instances described herein, it is assumed that during the state of refueling, the outlet valves for each tank are closed; and during the instance of consumption, the inlet valves for each tank are closed.

Figure 6E:
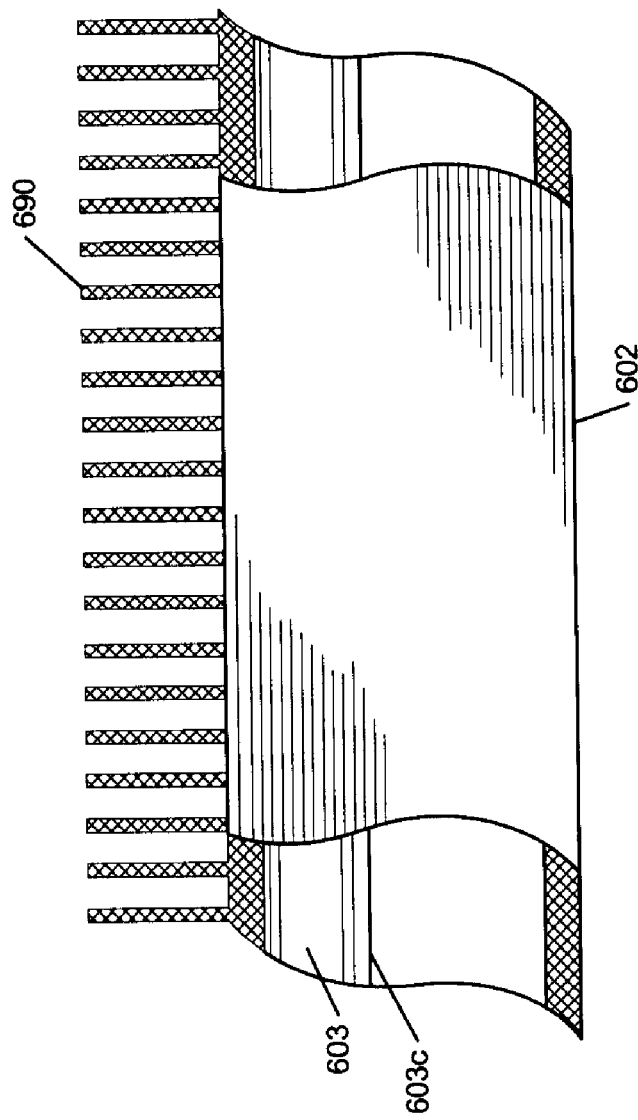
FIG. 6E and FIG. 6F show examples wherein the cooling tube comprising the cooling fluid circulating line is interior the vehicle frame component.

FIG. 6A shows a circulating fluid cooling line circuit 603 disposed within a vehicle frame component 602 surrounding tank 601 for circulating a cooling medium about the tank. Cooling media, which may be air or other fluid is received in inlet 615 and exhausted through outlet 625, which may include a fan 635 or other active means for removing heat from the cooling media. The cooling media circuit can be closed wherein fluid such as air, water, Freon®, etc., as referenced above as cooling media, flows within a continuous circuit for the absorption and evacuation of heat; or in the case of an open system, the inlet receives a supply of air and the other end is open to evacuate the heated air. FIG. 6B shows a circulating cooling line circuit 603 disposed within a vehicle frame component 602 formed from a heat absorbent material such as aluminum or an alloy thereof surrounding a high pressure tank 610, wherein the vehicle refueling gas is circulated through the circuit before entry into the tank, in accordance with an embodiment of the invention. In this example, the cooling system shown in FIG. 6A is a replacement for a radiator means otherwise referred to in the foregoing examples; the FIG. 6A system would work in tandem with the circulation means for the refuel gas circuit. FIG. 6C shows a cross section of the vehicle frame 602 at section 6C—→←—6C shown in FIG. 6A and FIG. 6B, illustrating refuel gas circulating tube 603 formed within the frame 602 and internal frame fins 650. FIG. 6D shows an example of an external tube circuit wherein tube 603 is surrounded by external fins 660. The circulating channel may be formed as an extruded or molded interior conduit; however, it is preferable that the circulating tube be a separate insert tube formed from a high thermal conductivity high strength material such as a copper, aluminum or stainless steel alloy. As a separate tube within, or supported by a frame sub assembly structure, the gas circulating system would be effectively insulated from frame stresses that might adversely affect the integrity of the circulating circuit.

Figure 6F:
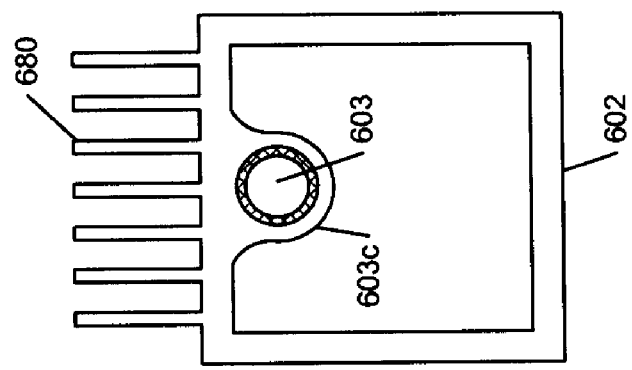

With reference to the elements of the examples discussed as radiator 22 in FIG. 2, as radiator 23*fr* in FIG. 3A and FIG. 3E, and as radiator 90 in FIG. 4, the heat radiating means shown in the elements 22, 23*fr* and 90 may be supplemented or replaced by the vehicle frame cooling systems shown in FIG. 6A, FIG. 6B, FIG. 6C and FIG. 6D in configurations disposed on a tubular (rectangular or curvilinear or equivalent) vehicle frame assembly 602. FIG. 6E and FIG. 6F similarly depict examples wherein a cooling tube 603 is disposed within a vehicle tube assembly in a structural cavity 603*c* within the frame interior. In FIG. 6E cooling fins, plates, or the like, 690, are disposed laterally across (perpendicular to the length of the structure beam) the tube; in FIG. 6F, the cooling fins 680 are disposed parallel to the length of the tube frame in configurations disposed on a tubular vehicle frame assembly 602. While a square cross sectioned tubular frame is shown, it is not intended to exclude circular, elliptical and other curvilinear shapes and multiple sided hollow or solid cross sectioned beams.

The cooling systems are not necessarily limited to active refill gas cooling wherein refuel gas flows in the cooling circuit to the vehicle tank. The systems are useful wherein heat captured by an endothermic internal absorbing media in the tank 1) such as by an liner interconnected to a radiator is employed or 2) when a coolant circulating coil circuit separate from the refueling process is circulated within the endothermic media within the tank to an exothermic radiator for external cooling in the systems shown herein as adapted by the vehicle control system.

Having described the invention in detail, those skilled in the art will appreciate that, given the present description, modifications may be made to the invention without departing from the spirit of the inventive concept herein described. Therefore, it is not intended that the scope of the invention be limited to the specific and preferred embodiments illustrated and described. Rather, it is intended that the scope of the invention be determined by the appended claims.

The invention claimed is:

1. A vehicle having one or more on board tank for the storage of a gas fuel under high pressure including,
   a fuel line for operatively interconnecting the one or more tank to a high pressure refilling line,
   endothermic heat absorbing means within the one or more tank for capturing heat of refueling through the cooling effect of the expansion of the gas in the tank when the one or more tank is operatively interconnected to a high pressure fuel depot refilling line, and
   a conduit interconnected with the endothermic absorbing means, for transferring the heat captured to an exothermic device for radiating the heat captured to an environment external to the one or more tank.

2. The vehicle of claim 1 wherein the heat absorbing means includes an endothermic conductive media within the one or more tank and a conduit is interconnected with the endothermic conductive media for transferring the captured heat to a radiator external to the tank.

3. The vehicle of claim 2 wherein the endothermic conductive media within the one or more tank comprises a heat sink.

4. The vehicle of claim 3 wherein the heat sink comprises one or more of a liner, fins, pins, plates, wave shaped mesh, corrugation like elements, and other devices having high thermal conductivity and high surface area per unit volume or weight.

5. The vehicle of claim 2 wherein the conduit comprises one of 1) a longitudinally extended highly thermally conductive means formed from a metal material or 2) a heat pipe interconnecting the conduit and the radiator external to the tank.

6. The vehicle of claim 5 wherein the radiator external to the tank includes a fan or blower providing an air current in an operative relationship with the radiator for assisting in removing the captured heat transferred to the exothermic device.

7. A vehicle having one or more on board tank for the storage of a gas fuel under high pressure including,
   a vehicle fuel line for interconnecting the one or more tank to a high pressure fuel depot refilling line,
   a conduit for directing the high pressure gas fuel from the refilling line through an endothermic heat absorbing means within the one or more tank for capturing the heat of refueling resulting from gas compression when the one or more tank is operatively interconnected to the high pressure fuel depot refilling line to an exothermic device for radiating the captured heat to an environment external to the one or more tank, and into the one or more tank after the fuel in the conduit passes through the exothermic device.

8. The vehicle of claim 7 wherein the conduit circulates the fuel through a heat sink.

9. The vehicle of claim 8 wherein the heat sink comprises one or more of fins, pins, plates, wave shaped mesh, corrugation like elements, and other devices having high thermal conductivity and high surface area per unit volume or weight.

10. The vehicle of claim 7 wherein the exothermic device external to the tank includes a fan or blower providing an air current in an operative relationship with the exothermic device for assisting in removing the captured heat that is transferred to the exothermic device.

11. The vehicle of claim 9 wherein the heat sink comprises a coiled fuel conduit circuit in an operative heat absorption relationship with one or more of the fins, pins, plates, wave shaped mesh, corrugation like elements, and other devices.

12. The vehicle of claim 1 or claim 7 including a plurality of tanks operatively interconnected such that each one of a tank is refilled individually.

13. The vehicle of claim 1 or claim 7 including a plurality of tanks operatively interconnected such one or more tank is refilled in a series configuration with another tank.

14. The vehicle of claim 1 or claim 7 including a plurality of tanks operatively interconnected such two or more tanks are refilled in a parallel configuration.

15. The vehicle of claim 1 or claim 7 wherein the vehicle includes a frame structure and the exothermic device includes means within the vehicle frame structure for removing the captured heat.

16. The vehicle of claim 15 wherein the frame structure of the vehicle includes a circulation tube for the refuel gas intrinsically formed therein such that the circulation tube in the frame comprises the exothermic device.

17. The vehicle of claim 7 wherein the vehicle includes a frame structure and the high pressure fuel from the refilling line circulates through a gas conduit within the vehicle frame structure before the fuel is stored in the one or more vehicle tank.

18. The vehicle of claim 1 wherein the refilling gas itself is an endothermic media as a result of the gas cooling as the gas expands in the tank and the gas, as so cooled, absorbs the heat of compression of the gas being refilled into the tank.

19. A vehicle having one or more on board tank for the storage of a gas fuel under high pressure including:

a connector associated with the one or more tank for directing gas flow from a high pressure fuel depot refilling line into the one or more tank, an endothermic device within the one or more tank for absorbing heat from high pressure refueling gas that heats as the gas is compressed when being introduced into the one or more tank, the endothermic device reducing the temperature of the refueling gas to a temperature lower than that of the refueling gas when the refueling gas expands and cools as the gas is introduced into the tank, and a circulation system interconnected with the endothermic device circulating the refueling gas through the endothermic device within the tank to an exothermic device for radiating the heat captured from the refueling gas to an environment external to the one or more tank wherein the refueling gas is introduced into the one or more tank after the gas circulates through the exothermic device.

* * * * *